(12) United States Patent
Echard

(10) Patent No.: US 11,751,540 B2
(45) Date of Patent: Sep. 12, 2023

(54) RETRACTABLE LEASH ASSEMBLY FOR AN ANIMAL

(71) Applicant: Eric A. Echard, Kingsport, TN (US)

(72) Inventor: Eric A. Echard, Kingsport, TN (US)

( * ) Notice: Subject to any disclaimer, the term of this patent is extended or adjusted under 35 U.S.C. 154(b) by 120 days.

(21) Appl. No.: 17/109,527

(22) Filed: Dec. 2, 2020

(65) Prior Publication Data

US 2022/0167593 A1   Jun. 2, 2022

(51) Int. Cl.
*A01K 27/00* (2006.01)

(52) U.S. Cl.
CPC .......... *A01K 27/004* (2013.01); *A01K 27/001* (2013.01); *A01K 27/005* (2013.01)

(58) Field of Classification Search
CPC ... A01K 27/001; A01K 27/004; A01K 27/005
See application file for complete search history.

(56) References Cited

U.S. PATENT DOCUMENTS

| | | | | |
|---|---|---|---|---|
| 5,778,828 A * | 7/1998 | Klinkhart | ............. | A01K 13/006 119/815 |
| 7,040,256 B2 * | 5/2006 | Wiggins | ............... | A01K 27/005 119/796 |
| 8,151,735 B1 * | 4/2012 | McCrocklin | ......... | A01K 27/003 119/796 |
| 8,749,899 B1 * | 6/2014 | Peachee | ............... | G02B 25/008 359/813 |
| 9,107,394 B2 | 8/2015 | Geller | | |
| 11,470,923 B1 * | 10/2022 | Nikolla | ................. | A44B 99/005 |
| 2004/0154557 A1 * | 8/2004 | Meissner | ............. | A01K 27/004 119/796 |
| 2007/0215065 A1 * | 9/2007 | Furlich | ................ | A01K 27/003 119/795 |
| 2011/0067649 A1 * | 3/2011 | O'Brien | ............... | A01K 27/004 119/796 |
| 2012/0318212 A1 * | 12/2012 | Montenegro | ........ | A01K 27/004 119/796 |
| 2015/0128879 A1 * | 5/2015 | Anderson | ............ | A01K 27/004 119/796 |
| 2017/0360008 A1 | 12/2017 | Young | | |
| 2018/0116175 A1 * | 5/2018 | Lui | ...................... | A01K 27/001 |
| 2019/0208748 A1 | 7/2019 | Young | | |
| 2019/0246607 A1 * | 8/2019 | Chen | .................... | A01K 27/005 |

* cited by examiner

*Primary Examiner* — Joshua D Huson
*Assistant Examiner* — Edgar Reyes
(74) *Attorney, Agent, or Firm* — THE WEBB LAW FIRM

(57) ABSTRACT

A retractable leash assembly for an animal includes a first housing, a second housing, a cord member, and a retraction assembly. The first housing may be configured to be connected to a first collar. The second housing may be configured to be connected to a second collar. The cord member may be connected between the first housing and the second housing. The retraction assembly may be connected to the cord member. The first housing may include an opening configured to receive at least a portion of the second housing.

20 Claims, 9 Drawing Sheets

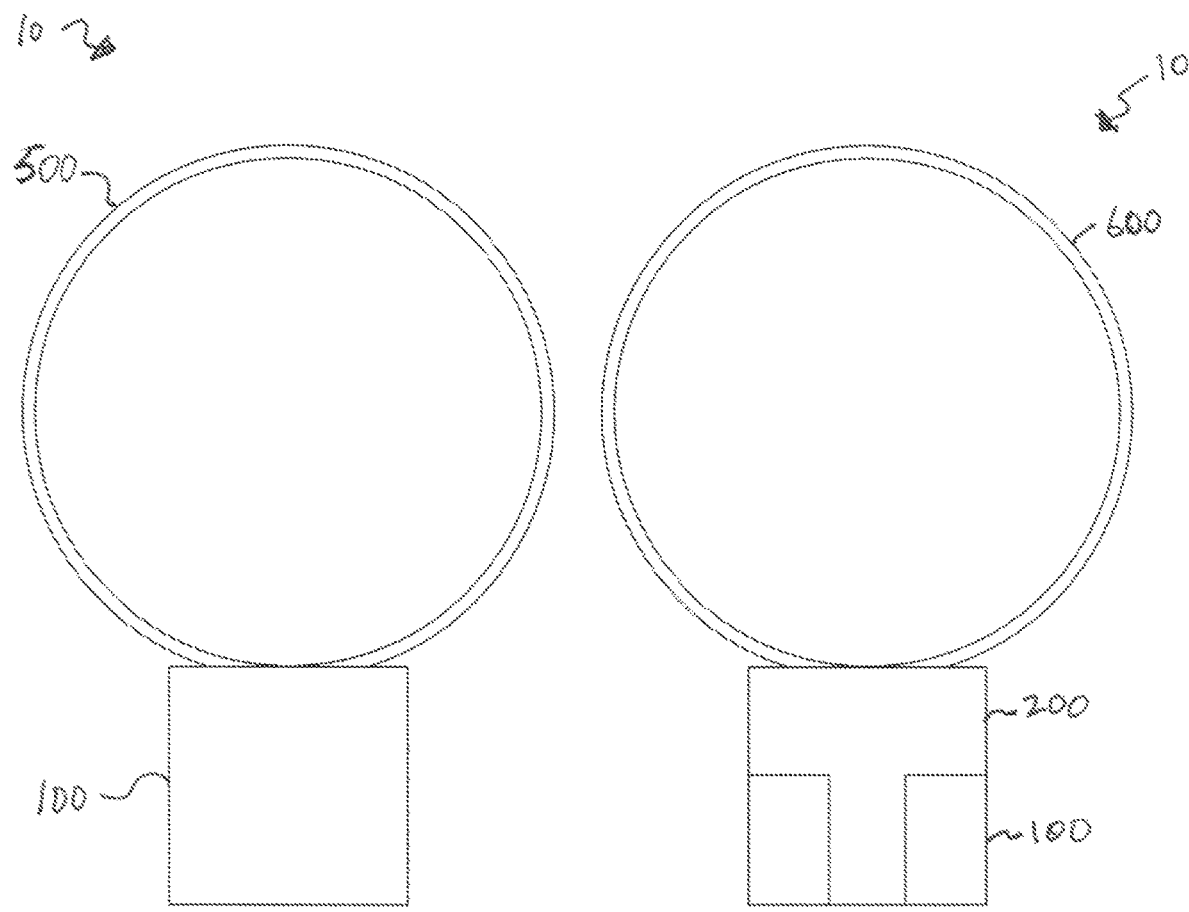

RETRACTABLE LEASH ASSEMBLY FOR AN ANIMAL

BACKGROUND

1. Field

The present disclosure relates generally to a leash assembly for an animal and, in some non-limiting embodiments or aspects, to a retractable leash and/or dual collar assembly for an animal.

2. Technical Considerations

Conventional retractable leashes are cumbersome and inconvenient for exchanging between a scenario in which the leash is carried by both a user and an animal (e.g., a dog, etc.) and a scenario in which the leash is carried solely by the animal. For example, if a user walking a dog with a conventional retractable leash releases a handle portion of the retractable leash held by the user, the handle portion may retract to hang awkwardly from the dog's neck, drag on the ground, and/or be difficult for the user to access should the user wish to grasp the handle while the retractable leash is being carried solely by the dog. Accordingly, there is a need in the art for a retractable leash assembly that enables exchanging between the above-described scenarios in a more user-friendly and efficient manner, and which provides for a less-cumbersome assembly when being carried solely by the animal.

SUMMARY

Accordingly, provided are improved retractable leash systems, devices, products, apparatuses, and/or assemblies for animals.

According to some non-limiting embodiments or aspects, provided is a retractable leash assembly for an animal including: a first housing configured to be connected to a first collar; a second housing configured to be connected to a second collar; a cord member connected between the first housing and the second housing; and a retraction assembly connected to the cord member, the first housing including an opening configured to receive at least a portion of the second housing.

According to some non-limiting embodiments or aspects, provided is a retractable leash assembly for an animal comprising: a first housing configured to be connected to a first collar; a second housing configured to be connected to a second collar; a cord member connected between the first housing and the second housing; and a retraction assembly connected to the cord member, the first housing having a first shape, and the second housing having a second shape configured to complementarily mate with the first shape of the first housing.

According to some non-limiting embodiments or aspects, provided is a retractable leash assembly for an animal comprising: a first housing configured to be connected to a first collar; a second housing configured to be connected to a second collar; a cord member connected between the first housing and the second housing; and a retraction assembly connected to the cord member, the first housing including a first magnet, and the second housing including a second magnet configured to form a magnetic connection with the first magnet of the first housing.

Further embodiments or aspects are set forth in the following numbered clauses:

Clause 1. A retractable leash assembly for an animal comprising: a first housing configured to be connected to a first collar; a second housing configured to be connected to a second collar; a cord member connected between the first housing and the second housing; and a retraction assembly connected to the cord member, wherein the first housing includes an opening configured to receive at least a portion of the second housing.

Clause 2. The retractable leash assembly of clause 1, wherein the first housing includes: a main portion extending between a first end and a second end; and a first arm and a second arm spaced apart from the first arm, wherein each of the first arm and the second arm extend from the main portion adjacent the first end of the main portion, and wherein the main portion, the first arm, and the second arm define the opening configured to receive the at least a portion of the second housing.

Clause 3. The retractable leash assembly of clauses 1 or 2, wherein the second housing includes: a first portion extending between a first end and a second end; and a second portion extending from the first portion between the first end and the second end of the first portion.

Clause 4. The retractable leash assembly of any of clauses 1-3, wherein, when the at least a portion of the second housing is received in the opening of the first housing, the second portion of the second housing is located between the first arm and the second arm of the first housing and the first portion of the second housing is located directly adjacent to the main portion of the first housing.

Clause 5. The retractable leash assembly of any of clauses 1-4, wherein a first end of the cord member is connected at the first end of the main portion of the first housing, and wherein a second end of the cord member opposite the first end of the cord member is connected at an end of the second portion of the second housing opposite the first portion of the second housing.

Clause 6. The retractable leash assembly of any of clauses 1-5, wherein the retraction assembly includes a first retraction assembly and a second retraction assembly, wherein the first housing includes the first retraction assembly connected to a first end of the cord member, and wherein the second housing includes the second retraction assembly connected to a second end of the cord member opposite the first end of the cord member.

Clause 7. The retractable leash assembly of any of clauses 1-6, wherein the first housing includes the retraction assembly, wherein the retraction assembly is connected to a first end of the cord member, and wherein the second housing is connected to a second end of the cord member opposite the first end of the cord member.

Clause 8. The retractable leash assembly of any of clauses 1-7, wherein the second housing includes the retraction assembly, wherein the first housing is connected to a first end of the cord member, and wherein the retraction assembly is connected to a second end of the cord member opposite the first end of the cord member.

Clause 9. The retractable leash assembly of any of clauses 1-8, wherein the first housing includes a first magnet, wherein the second housing includes a second magnet, and wherein, when the at least a portion of the second housing is received in the opening of the first housing, the first housing is connected to the second housing via a magnetic connection.

Clause 10. The retractable leash assembly of any of clauses 1-9, wherein the retraction assembly includes a spool member configured to rotate about an axis to release or retract the cord member wrapped about the spool member, and wherein the spool member is rotatably biased to retract the cord member within the at least one of the first housing and the second housing including the retraction assembly.

Clause 11. The retractable leash assembly of any of clauses 1-10, wherein the retraction assembly includes a first retraction assembly and a second retraction assembly, and wherein the cord member includes a first cord member and a second cord member, wherein a first end of the first cord member is connected to the first housing, wherein a second end of the first cord member is connected to the first retraction assembly, wherein a first end of the second cord member is connected to the second housing, wherein a second end of the second cord member is connected to the second retraction assembly, and wherein the first retraction assembly is connected to the second retraction assembly.

Clause 12. The retractable leash assembly of any of clauses 1-11, wherein a first end of the cord member is connected to the first housing, wherein a second end of the cord member is connected to the second housing, and wherein a portion of the cord member between the first end of the cord member and the second end of the cord member is connected to the retraction assembly.

Clause 13. The retractable leash assembly of any of clauses 1-12, wherein each of the first housing and the second housing are formed of a magnetized material.

Clause 14. The retractable leash assembly of any of clauses 1-13, further comprising: the first collar; and the second collar.

Clause 15. The retractable leash assembly of any of clauses 1-14, wherein the first collar includes a first connector spaced apart from the first housing, and wherein the second collar includes a second connector spaced apart from the second housing, and wherein the second connector is configured to form a connection with the first connector.

Clause 16. The retractable leash assembly of any of clauses 1-15, wherein the connection includes at least one of the following: a Velcro connection, a magnetic connection, a snap fit connection, or any combination thereof.

Clause 17. The retractable leash assembly of any of clauses 1-16, wherein the first housing is removably connected to the first collar, and wherein the second housing is removably connected to the second collar.

Clause 18. The retractable leash assembly of any of clauses 1-17, wherein the first housing includes first walls defining the opening, wherein the second housing includes second walls configured to be received within the opening, and wherein the first walls and the second walls form a press fit connection when the second walls are received within the opening.

Clause 19. A retractable leash assembly for an animal comprising: a first housing configured to be connected to a first collar; a second housing configured to be connected to a second collar; a cord member connected between the first housing and the second housing; and a retraction assembly connected to the cord member, wherein the first housing has a first shape, and wherein the second housing has a second shape configured to complementarily mate with the first shape of the first housing.

Clause 20. A retractable leash assembly for an animal comprising: a first housing configured to be connected to a first collar; a second housing configured to be connected to a second collar; a cord member connected between the first housing and the second housing; and a retraction assembly connected to the cord member, wherein the first housing includes a first magnet, and wherein the second housing includes a second magnet configured to form a magnetic connection with the first magnet of the first housing.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details of embodiments or aspects of the present disclosure are explained in greater detail below with reference to the exemplary embodiments that are illustrated in the accompanying schematic figures, in which:

FIG. 5 is a side view of non-limiting embodiments or aspects of a retractable leash assembly;

FIG. 6 is a side view of non-limiting embodiments or aspects of a retractable leash assembly;

DETAILED DESCRIPTION

Figure 1:
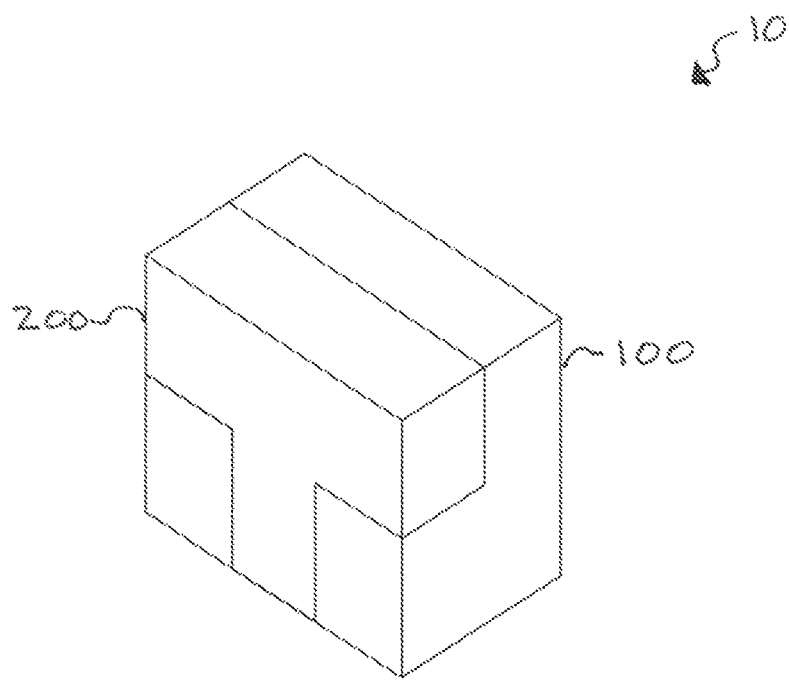
FIG. 1 is a perspective view of non-limiting embodiments or aspects of a retractable leash assembly.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to the present disclosure as it is oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least in partially on" unless explicitly stated otherwise.

Referring to FIGS. 1-10, a retractable leash assembly 10 may include a first housing 100, a second housing 200, a cord member 300, and/or a retraction assembly 400. The first housing 100 may include an opening 110 configured to receive at least a portion of the second housing 200. For example, the first housing 100 may have a first shape, and the second housing 200 may have a second shape configured to complementarily mate with the first shape of the first housing 100. Additionally, or alternatively, the first housing 100 may be configured to be connected to the second housing 200 via a magnetic connection. For example, the first housing 100 may include a first magnet 120, and the second housing 200 may include a second magnet 220 configured to form the magnetic connection with the first magnet 120 of the first housing 100 (e.g., when at least a portion of the second housing 200 is received in the opening 110 of the first housing 100, when the first housing 100 is directly adjacent to the second housing 200, etc.). As an example, the first housing 100 and the second housing 200 may be formed of a magnetized material configured to form the magnetic connection. Accordingly, the first housing 100 may be automatically joined and/or held in place against movement and/or jostling with respect to the second housing 200 by these mechanical and/or magnetic structures, thereby providing for a less-cumbersome assembly when the retractable leash assembly 10 is being carried solely by the animal.

In some non-limiting embodiments or aspects, and as shown in FIGS. 4, 5, and 9A-9E, the first housing 100 may be configured to be connected to a first collar 500. For example, the first housing 100 may be removably connected to or permanently connected to the first collar 500. As an example, the first housing 100 may be integrated with the first collar 500. As an example, the first housing 100 may be connected to the first collar 500 via a ring or a hook on the first housing 100 and a swivel-eye hook, a fixed-eye snap hook, or a carabiner on the first collar 500 (or vice-versa). In some non-limiting embodiments or aspects, the first collar 500 may include first and second buckle members (not shown) that are detachably attachable to each other to open and/or adjust a size of the first collar 500.

In some non-limiting embodiments or aspects, and as shown in FIGS. 4, 6, and 9A-9E, the second housing 200 may be configured to be connected to a second collar 600. For example, the second housing 200 may be removably connected to or permanently connected to the second collar 600. As an example, the second housing 200 may be integrated with the second collar 600. As an example, the second housing 200 may be connected to the second collar 600 via a ring or a hook on the second housing 200 and a swivel-eye hook, a fixed-eye snap hook, or a carabiner on the second collar 600 (or vice-versa). In some non-limiting embodiments or aspects, the second collar 600 may include first and second buckle members (not shown) that are detachably attachable to each other to open and/or adjust a size of the second collar 600.

Figure 4:
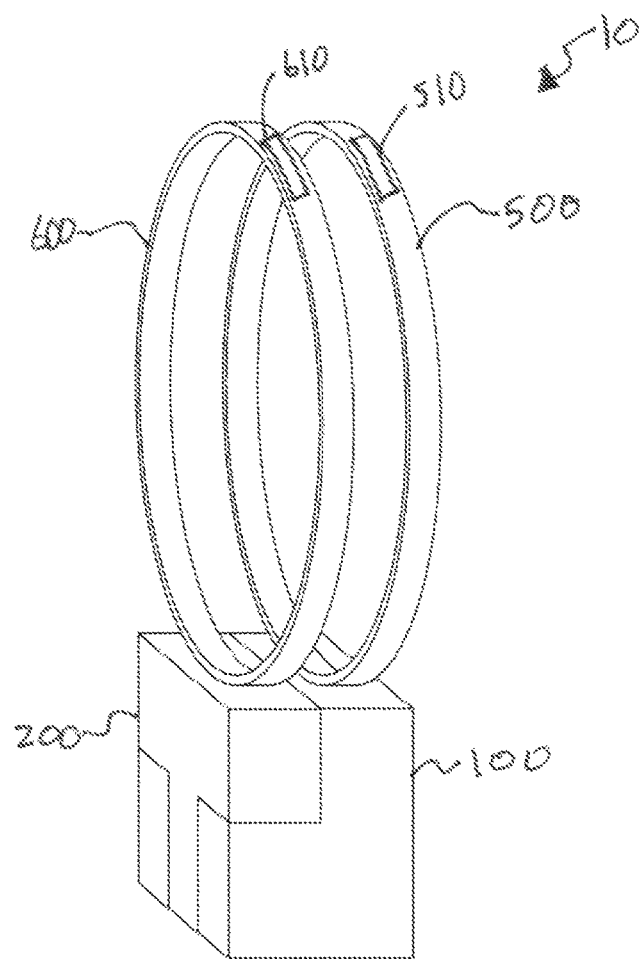
FIG. 4 is a perspective view of non-limiting embodiments or aspects of a retractable leash assembly.
Figure 7:
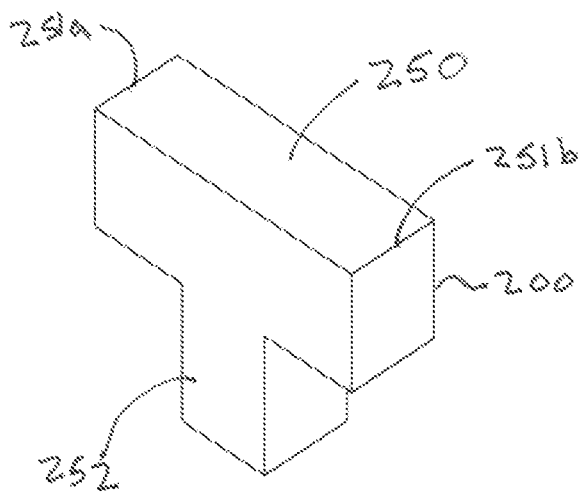
FIG. 7 is a perspective view of an implementation of a first housing of a retractable leash assembly according to non-limiting embodiments or aspects.
Figure 8:
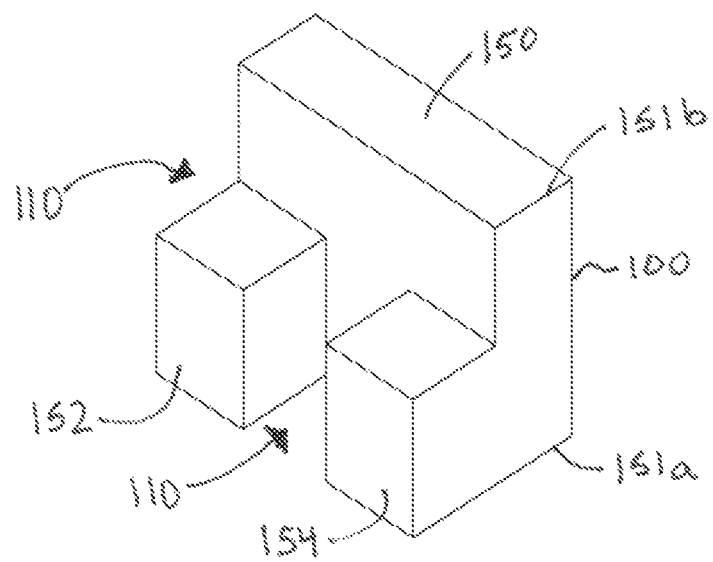
FIG. 8 is a perspective view of an implementation of a second housing of a retractable leash assembly according to non-limiting embodiments or aspects.

As shown in FIG. 4, the first collar 500 may include a first connector 510 spaced apart from the first housing 100, the second collar 600 may include a second connector 610 spaced apart from the second housing 200, and the second connector 610 may be configured to form a connection with the first connector 510. For example, the connection may include at least one of the following: a Velcro connection, a magnetic connection, a snap fit connection, or any combination thereof.

Accordingly, the first collar 500 and the second collar 600 may each be carried around the neck of an animal while the assembly is being carried solely by the animal, and a user may access the retractable leash assembly 10 in a more user-friendly and efficient manner by grasping one of the handles to switch to a scenario in which the leash is carried by both the user and the animal so that the user can easily gain control of the animal.

The cord member 300 (e.g., a string, a rope, a leash, etc.) may be connected between the first housing 100 (and/or the retraction assembly 400) and the second housing 200 (and/or the retraction assembly 400). For example, a first end of the cord member 300 may be connected to (e.g., directly connected to, etc.) the first housing 100 (and/or the retraction assembly 400), a second end of the cord member 300 may be connected to (e.g., directly connected to, etc.) the second housing 200 (and/or the retraction assembly 400), and/or a middle of the cord member 300 between the first and second ends may be connected to the retraction assembly 400.

The retraction assembly 400 may be connected to the cord member 300. For example, the retraction assembly 400 may include a spool member 410 configured to rotate about an axis to release or retract the cord member 300 wrapped about the spool member 410, and the spool member 410 may be rotatably biased to retract the cord member 300 within at least one of a housing of the retraction assembly 400, the first housing 100, and/or the second housing 200. As an example, in operation, the first housing 100 and the second housing 200 may be mated, connected to, and/or adjacent to each other due to a retraction force or bias of the retraction assembly 400, and the first housing 100 and the second housing 200 may be separated from each other to extend or release a length of the cord member 300 by a user applying a force to the cord member 300 opposite to the retraction force of the retraction assembly 400. In some non-limiting embodiments or aspects, at least one of the first housing 100 and the second housing 200 may include the retraction assembly 400 and at least one compressible pressure element (not shown) disposed thereon to restrict movement of the cord member 300 from the retraction assembly 400 when the at least one pressure element is depressed.

Figure 9A:
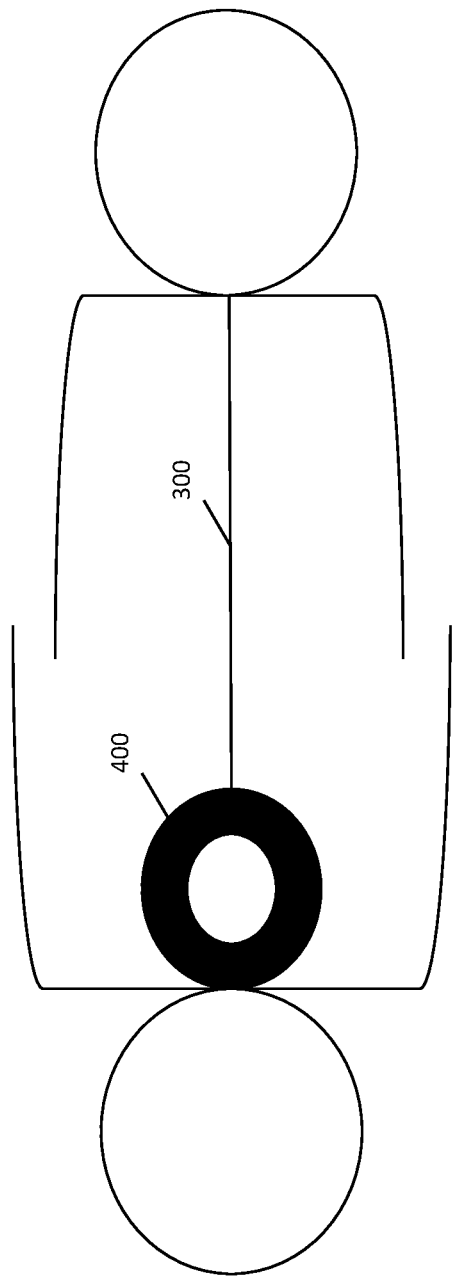
FIGS. 9A-9E are cut-away views of non-limiting embodiments or aspects of a retractable leash assembly.
Figure 9B:
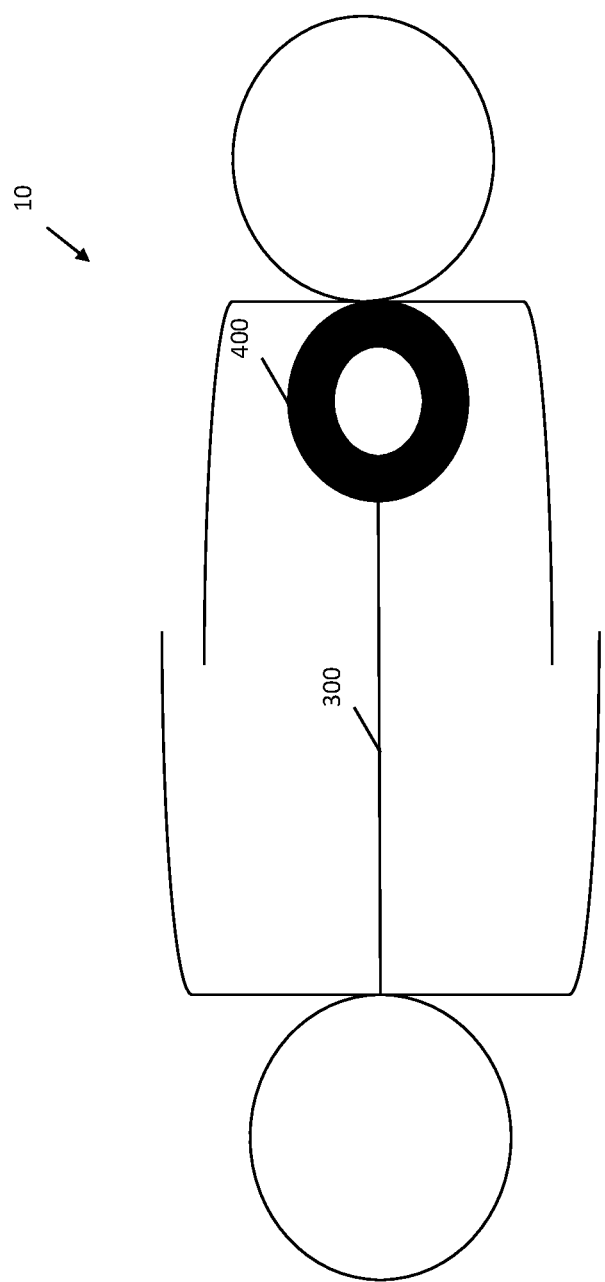

In some non-limiting embodiments or aspects, a first end of the cord member 300 may be connected to (e.g., directly connected to, etc.) one of the first housing 100 and the second housing 200, a second end of the cord member 300 may be connected to the retraction assembly 400, and the retraction assembly 400 may be included in and/or connected to the other of the first housing 100 and the second housing 200. For example, as shown in FIG. 9A, the first housing 100 may include the retraction assembly 400, the retraction assembly 400 may be connected to a first end of the cord member 300, and the second housing 200 may be connected to a second end of the cord member 300 opposite the first end of the cord member 300. In such an example, the cord member 300 may extend or release from the first housing 100 in response to a pulling force applied to the cord member 300 that overcomes the retraction force of the retraction assembly 400. As an example, as shown in FIG. 9B, the second housing 200 may include the retraction assembly 400, the first housing 100 may be connected to a first end of the cord member 300, and the retraction assembly 400 may be connected to a second end of the cord member 300 opposite the first end of the cord member 300. In such an example, the cord member 300 may extend or release from the second housing 200 in response to a pulling force applied to the cord member 300 that overcomes the retraction force of the retraction assembly 400.

Figure 9C:
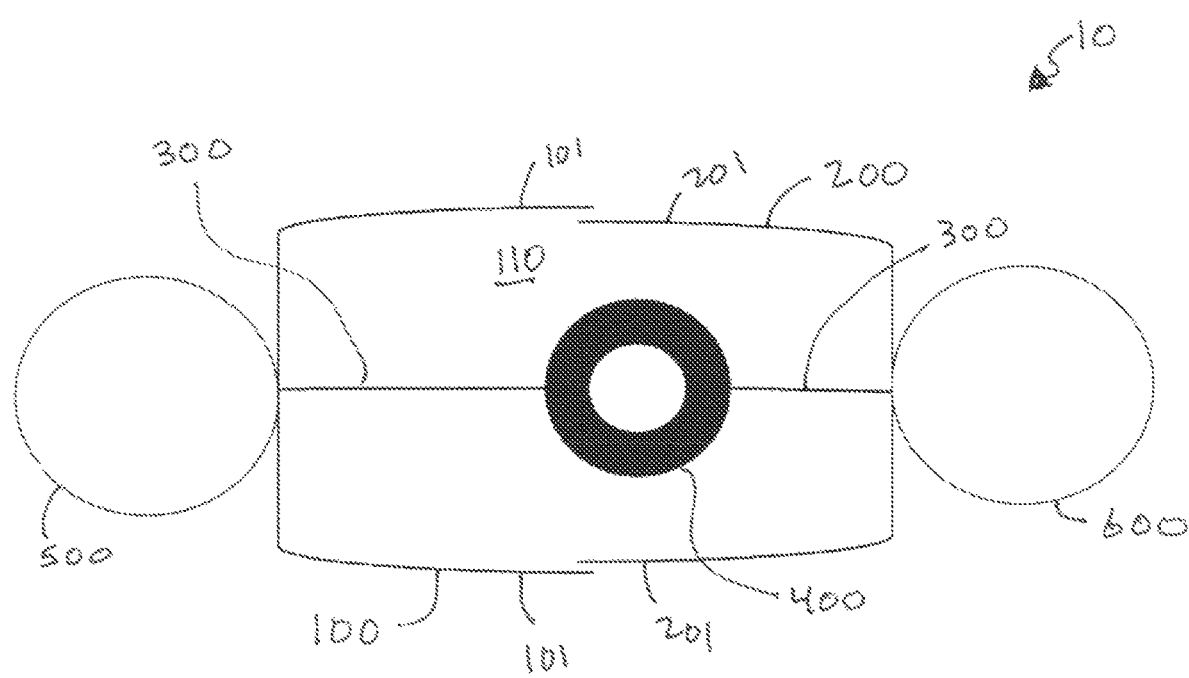
Figure 10:
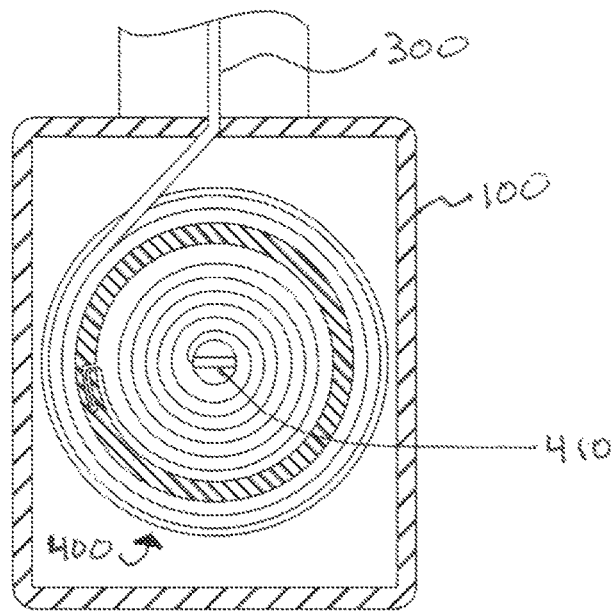
FIG. 10 is a cut-away view of an implementation of a second housing of a retractable leash assembly according to non-limiting embodiments or aspects.

In some non-limiting embodiments or aspects, a first end of the cord member 300 may be connected to (e.g., directly connected to, etc.) the first housing 100, a second end of the cord member 300 may be connected to (e.g., directly connected to, etc.) the second housing 200, and a portion of the cord member 300 between the first end and the second end may be connected to the retraction assembly 400 (e.g., the retraction assembly 400 may not be directly connected to either of the first housing 100 and the second housing 200, etc.). For example, as shown in FIG. 9C, a first side of the cord member 300 adjacent the first end may extend from and/or retract about the retraction assembly 400 in a first direction and/or in response to a first pulling force, and a second side of the cord member 300 may extend from and/or retract about the retraction assembly 400 in a second direction and/or in response to a second pulling force.

Figure 9D:
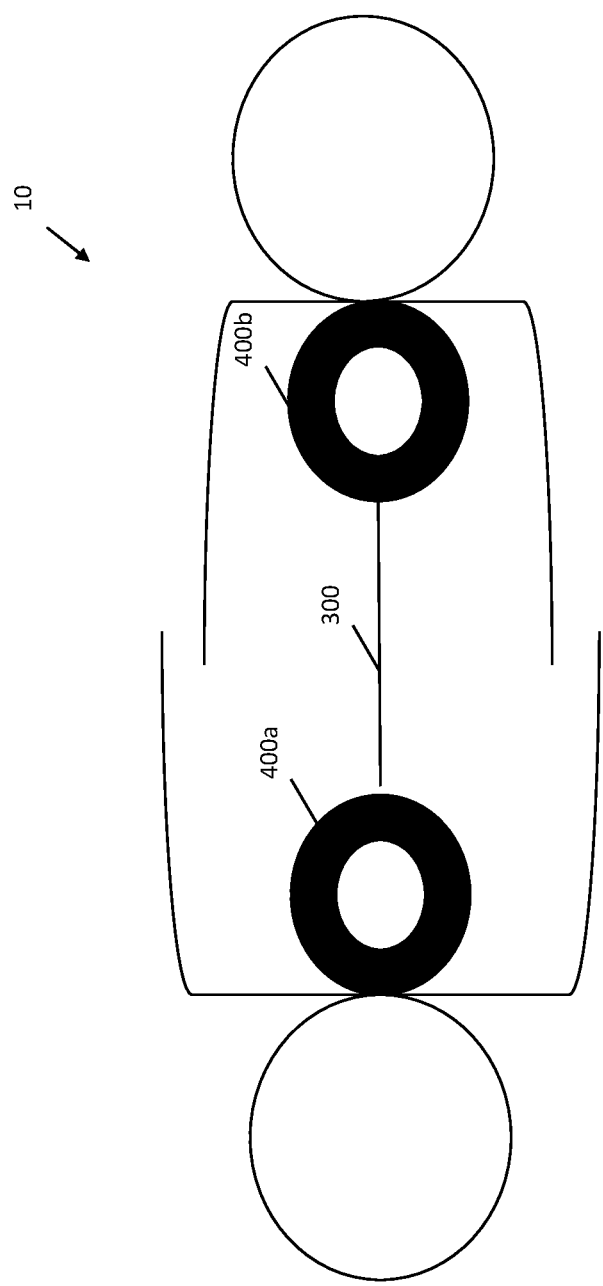

In some non-limiting embodiments or aspects, the retraction assembly includes two retraction assemblies 400 and the cord member includes a single cord member 300. For example, as shown in FIG. 9D, the first housing 100 may include and/or be connected to a first retraction assembly 400a, the first retraction assembly 400a may be connected to a first end of the single cord member 300, the second housing 200 may include and/or be connected to a second retraction assembly 400b, and the second retraction assembly 400b may be connected to a second end of the single cord member 300 opposite the first end of the cord member.

Figure 9E:
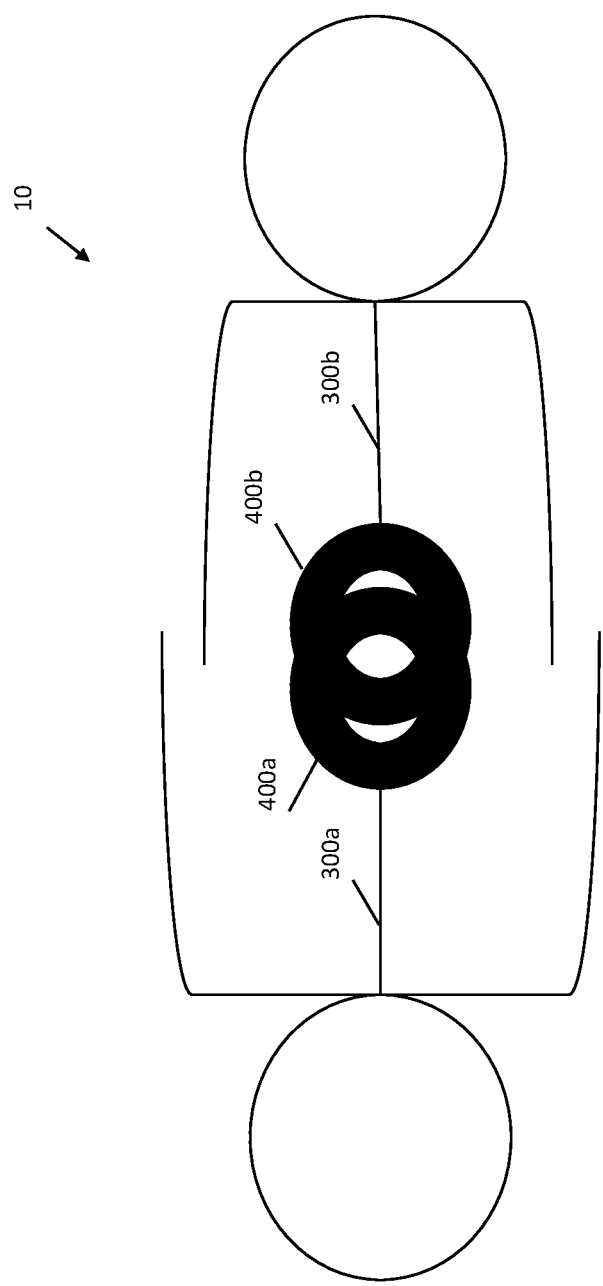

In some non-limiting embodiments or aspects, the cord member 300 may include two cord members 300 and the retraction assembly 400 may include two retraction assemblies 400. For example, as shown in FIG. 9E, the retraction assembly 400 may include a first retraction assembly 400a and a second retraction assembly 400b, the cord member 300 may include a first cord member 300a and a second cord member 300b, a first end of the first cord member 300a may be connected to the first housing 100, a second end of the first cord member 300a may be connected to the first retraction assembly 400a, a first end of the second cord member 300b may be connected to the second housing 200, a second end of the second cord member 300b may be connected to the second retraction assembly 400b, and the first retraction assembly 400a may be connected to the second retraction assembly 400b.

In some non-limiting embodiments or aspects, and as shown in FIGS. 1-6 and 8, the first housing 100 may include a main portion 150 extending between a first end 151a and a second end 151b, a first arm 152, and a second arm 154 spaced apart from the first arm 152. For example, each of the first arm 152 and the second arm 154 may extend from the main portion 150 adjacent the first end 151a of the main portion 150, and the main portion 150, the first arm 152, and the second arm 154 may define the opening 110 configured to receive the at least a portion of the second housing 200.

Figure 2:
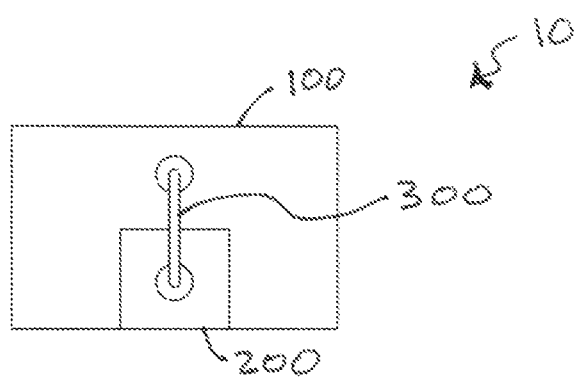
FIG. 2 is a side or bottom view of non-limiting embodiments or aspects of a retractable leash assembly.
Figure 3:
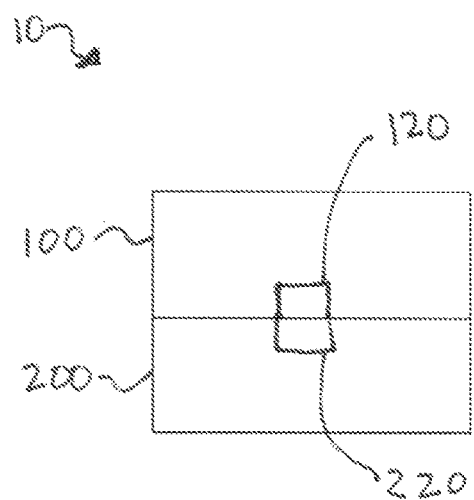
FIG. 3 is another side or top view of non-limiting embodiments or aspects of a retractable leash assembly.

In some non-limiting embodiments or aspects, and as shown in FIGS. 1-7, the second housing 200 may include a first portion 250 extending between a first end 251a and a second end 251b and a second portion 252 extending from the first portion 250 between the first end 251a and the second end 251b of the first portion 250. For example, when the at least a portion of the second housing 200 is received in the opening 110 of the first housing 100, the second portion 252 of the second housing 200 may be located between the first arm 152 and the second arm 154 of the first housing 100 and the first portion 250 of the second housing 200 may be located directly adjacent to the main portion 150 of the first housing 100. In such an example, as shown in FIG. 2, a first end of the cord member 300 may be connected at (and/or pass through) the first end 151a of the main portion 150 of the first housing 100, and a second end of the cord member 300 opposite the first end of the cord member 300 may be connected at (and/or pass through) an end of the second portion 252 of the second housing 200 opposite the first portion 250 of the second housing 200.

Although shown in FIGS. 1-8 with first arm 152 and second arm 154 extending from lower-side portions of the main portion 150, non-limiting embodiments or aspects are not limited thereto, and first arm 152 and/or second arm 154 may extend from any portion of the main portion 150 of first housing 100 to define the opening 110 in a manner that is configured to receive a portion of the second housing 200. Similarly, although shown in FIGS. 1-8 as having a T-shape, non-limiting embodiments or aspects are not limited thereto, and second housing 200 may have any shape that includes a portion configured to be received in the opening 110 defined by the shape of the first housing 100. For example, and referring to FIGS. 9A-9E, first housing 100 may include first walls 101 defining the opening 110, and second housing 200 may include second walls 201 configured to be received within the opening 110 defined by the walls 101 and 201 of the first housing 100. As an example, the walls 101 and 201 may form a press-fit connection, a snap-fit connection, and/or the like.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A retractable leash assembly for an animal comprising:
   a first housing configured to be connected to a first collar;
   a second housing configured to be connected to a second collar;
   a cord member connected between the first housing and the second housing; and a retraction assembly connected to the cord member,
wherein the first housing includes an opening configured to receive at least a portion of the second housing, and
wherein the first housing and the second housing are configured to be separated from each other to release a length of the cord member from the retraction assembly in response to a force applied to the cord member opposite to a retraction force of the retraction assembly such that the first housing and the second housing remain connected to each other via the cord member.

2. The retractable leash assembly of claim 1, wherein the first housing includes:
a main portion extending between a first end and a second end; and
a first arm and a second arm spaced apart from the first arm, wherein each of the first arm and the second arm extend from the main portion adjacent the first end of the main portion, and wherein the main portion, the first arm, and the second arm define the opening configured to receive the at least a portion of the second housing.

3. The retractable leash assembly of claim 2, wherein the second housing includes:
a first portion extending between a first end and a second end; and
a second portion extending from the first portion between the first end and the second end of the first portion.

4. The retractable leash assembly of claim 3, wherein, when the at least a portion of the second housing is received in the opening of the first housing, the second portion of the second housing is located between the first arm and the second arm of the first housing and the first portion of the second housing is located directly adjacent to the main portion of the first housing.

5. The retractable leash assembly of claim 4, wherein a first end of the cord member is connected at the first end of the main portion of the first housing, and wherein a second end of the cord member opposite the first end of the cord member is connected at an end of the second portion of the second housing opposite the first portion of the second housing.

6. The retractable leash assembly of claim 1, wherein the retraction assembly includes a first retraction assembly and a second retraction assembly, wherein the first housing includes the first retraction assembly connected to a first end of the cord member, and wherein the second housing includes the second retraction assembly connected to a second end of the cord member opposite the first end of the cord member.

7. The retractable leash assembly of claim 1, wherein the first housing includes the retraction assembly, wherein the retraction assembly is connected to a first end of the cord member, and wherein the second housing is connected to a second end of the cord member opposite the first end of the cord member.

8. The retractable leash assembly of claim 1, wherein the second housing includes the retraction assembly, wherein the first housing is connected to a first end of the cord member, and wherein the retraction assembly is connected to a second end of the cord member opposite the first end of the cord member.

9. The retractable leash assembly of claim 1, wherein the first housing includes a first magnet, wherein the second housing includes a second magnet, and wherein, when the at least a portion of the second housing is received in the opening of the first housing, the first housing is connected to the second housing via a magnetic connection.

10. The retractable leash assembly of claim 1, wherein the retraction assembly includes a spool member configured to rotate about an axis to release or retract the cord member wrapped about the spool member, and wherein the spool member is rotatably biased to retract the cord member within the at least one of the first housing and the second housing including the retraction assembly.

11. The retractable leash assembly of claim 10, wherein the retraction assembly includes a first retraction assembly and a second retraction assembly, and wherein the cord member includes a first cord member and a second cord member, wherein a first end of the first cord member is connected to the first housing, wherein a second end of the first cord member is connected to the first retraction assembly, wherein a first end of the second cord member is connected to the second housing, wherein a second end of the second cord member is connected to the second retraction assembly, and wherein the first retraction assembly is connected to the second retraction assembly.

12. The retractable leash assembly of claim 1, wherein a first end of the cord member is connected to the first housing, wherein a second end of the cord member is connected to the second housing, and wherein a portion of the cord member between the first end of the cord member and the second end of the cord member is connected to the retraction assembly.

13. The retractable leash assembly of claim 1, wherein each of the first housing and the second housing are formed of a magnetized material.

14. The retractable leash assembly of claim 1, further comprising:
the first collar; and
the second collar.

15. The retractable leash assembly of claim 14, wherein the first collar includes a first connector spaced apart from the first housing, and wherein the second collar includes a second connector spaced apart from the second housing, and wherein the second connector is configured to form a connection with the first connector.

16. The retractable leash assembly of claim 15, wherein the connection includes at least one of the following: a hook and loop fastener connection, a magnetic connection, a snap fit connection, or any combination thereof.

17. The retractable leash assembly of claim 14, wherein the first housing is removably connected to the first collar, and wherein the second housing is removably connected to the second collar.

18. The retractable leash assembly of claim 14, wherein the first housing includes first walls defining the opening, wherein the second housing includes second walls configured to be received within the opening, and wherein the first walls and the second walls form a press fit connection when the second walls are received within the opening.

19. A retractable leash assembly for an animal comprising:
a first housing configured to be connected to a first collar;
a second housing configured to be connected to a second collar;
a cord member connected between the first housing and the second housing; and
a retraction assembly connected to the cord member,
wherein the first housing has a first shape, and
wherein the second housing has a second shape configured to complementarily mate with the first shape of the first housing, and
wherein the first housing and the second housing are configured to be separated from each other to release a length of the cord member from the retraction assembly in response to a force applied to the cord member opposite to a retraction force of the retraction assembly such that the first housing and the second housing remain connected to each other via the cord member.

20. A retractable leash assembly for an animal comprising:
a first housing configured to be connected to a first collar;
a second housing configured to be connected to a second collar;
a cord member connected between the first housing and the second housing; and
a retraction assembly connected to the cord member,
wherein the first housing and the second housing are biased adjacent to each other by a retraction force of the retraction assembly applied to the cord member, and
wherein the first housing and the second housing are configured to be separated from each other to release a length of the cord member from the retraction assembly in response to a force applied to the cord member opposite to the retraction force of the retraction assembly such that the first housing and the second housing remain connected to each other via the cord member.

* * * * *